(12) United States Patent
Yu et al.

(10) Patent No.: US 11,391,885 B2
(45) Date of Patent: Jul. 19, 2022

(54) LIGHT BAR ASSEMBLY, BACKLIGHT UNIT, DISPLAY UNIT AND MOBILE ELECTRONIC DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Hongyang Yu, Beijing (CN); Fang Zhang, Beijing (CN); Ruifeng Yang, Beijing (CN); Litao Fan, Beijing (CN); Yufei Liu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 398 days.

(21) Appl. No.: 16/490,342

(22) PCT Filed: Apr. 2, 2019

(86) PCT No.: PCT/CN2019/081010
§ 371 (c)(1),
(2) Date: Aug. 30, 2019

(87) PCT Pub. No.: WO2019/205902
PCT Pub. Date: Oct. 31, 2019

(65) Prior Publication Data
US 2021/0382224 A1 Dec. 9, 2021

(30) Foreign Application Priority Data

Apr. 26, 2018 (CN) .......................... 201810385477.4

(51) Int. Cl.
*F21V 8/00* (2006.01)
*H05B 47/155* (2020.01)
(Continued)

(52) U.S. Cl.
CPC ........... *G02B 6/0083* (2013.01); *G02B 6/009* (2013.01); *G02B 6/0091* (2013.01);
(Continued)

(58) Field of Classification Search
CPC ............. F21Y 2113/00; F21Y 2113/20; G02B 6/0083; G02B 6/009; G02B 6/0091;
(Continued)

(56) References Cited

U.S. PATENT DOCUMENTS

2018/0088272 A1* 3/2018 Chen .................... G02B 6/0031
2018/0150674 A1* 5/2018 Ryu ..................... G02B 6/0091

FOREIGN PATENT DOCUMENTS

CN 101315963 A 12/2008
CN 104519255 A 4/2015
(Continued)

OTHER PUBLICATIONS

First Office Action dated Jul. 23, 2019 corresponding to Chinese application No. 201810385477.4.
(Continued)

*Primary Examiner* — Keith G. Delahoussaye
(74) *Attorney, Agent, or Firm* — Nath, Goldberg & Meyer; Joshua B. Goldberg

(57) ABSTRACT

The present disclosure provides a light bar assembly, a backlight unit, a display unit and a mobile electronic device. The light bar assembly includes: a light bar printed circuit board; a plurality of backlights electrically connected to the light bar printed circuit board; and at least one till light electrically connected to the light bar printed circuit hoard. The light bar printed circuit board includes a first circuit and (Continued)

a second circuit connected to a drive circuit, the first circuit is configured to provide an electrical signal to the backlights, and the second circuit is configured to provide an electrical signal to the fill light.

14 Claims, 4 Drawing Sheets

(51) Int. Cl.
*G02F 1/13357* (2006.01)
*H04M 1/02* (2006.01)
*G03B 15/05* (2021.01)

(52) U.S. Cl.
CPC .... *G02F 1/133615* (2013.01); *H04M 1/0264* (2013.01); *H04M 1/0266* (2013.01); *H05B 47/155* (2020.01); *G02B 6/0055* (2013.01); *G03B 15/05* (2013.01)

(58) Field of Classification Search
CPC ............. G03B 15/05; G02F 1/133615; H04M 1/0264; H04M 1/0266; H05B 47/155
See application file for complete search history.

(56) References Cited

FOREIGN PATENT DOCUMENTS

| | | |
|---|---|---|
| CN | 106094393 A | 11/2016 |
| CN | 106338875 A | 1/2017 |
| CN | 207022061 U | 2/2018 |
| CN | 108594567 A | 9/2018 |
| JP | 10333225 A | 12/1998 |

OTHER PUBLICATIONS

Second Office Action dated Jan. 21, 2020 corresponding to Chinese application No. 201810385477.4.

* cited by examiner

LIGHT BAR ASSEMBLY, BACKLIGHT UNIT, DISPLAY UNIT AND MOBILE ELECTRONIC DEVICE

CROSS-REFERENCE TO RELATED APPLICATION

This is a National Phase Application filed under 35 U.S.C. 371 as a national stage of PCT/CN2019/081010, filed on Apr. 2, 2019, an application claiming priority from Chinese Patent Application No. 201810385477.4 filed with the Chinese Intellectual Property Office on Apr. 26, 2018, the disclosure of which is incorporated herein by reference in its entirety.

TECHNICAL FIELD

The present disclosure relates to the field of display technology and camera technology, and particularly relates to a light bar assembly, a backlight unit, a display unit and a mobile electronic device.

BACKGROUND

In daily life, people often need to take selfies on their mobile phones, tablets, etc. Taking a mobile phone as an example, a camera and a fill light are generally disposed at an upper end on a front (i.e., the display screen side) of the mobile phone, where the fill light is used for emitting light when selfies are taken to meet the luminance requirement. However, the above method requires separate settings of the fill light and its drive circuit, etc., resulting in a complicated product structure.

In another existing solution, the fill light is not provided on the front of the mobile phone. Instead, the display screen of the mobile phone is controlled to display white at the moment of taking a selfie to fill light for the user. Most of the existing mobile phone display screens are liquid crystal display units. Light emitted from the liquid crystal display unit is emitted from a backlight, passes a plurality of film materials of a backlight unit, through a liquid crystal panel, a polarizer, etc., before being emitted from the liquid crystal display unit. As a result, there will be a great loss in luminance. In addition, the liquid crystal display unit generally has insufficient luminance when displaying a pure white screen, and thus may fail to meet the fill light requirement. Moreover, when the liquid crystal display unit displays a pure white screen, the backlight in the liquid crystal display unit is subjected to a larger current impact, which affects the life of the backlight.

SUMMARY

The present disclosure has been accomplished in order to at least partially solve the problems in related art. The present disclosure provides a light bar assembly, a backlight unit, a display unit and a mobile electronic device that can simplify a product structure.

According to an aspect of the present disclosure, there is provided a light bar assembly, including a light bar printed circuit board;

a plurality of backlights electrically connected to the light bar printed circuit board; and at least one fill light electrically connected to the light bar printed circuit board, wherein the light bar printed circuit board includes a first circuit and a second circuit connected to a drive circuit, the first circuit is configured to provide an electrical signal to the backlights, and the second circuit is configured to provide an electrical signal to the fill light.

In some embodiments, the first circuit and the second circuit are configured to be not connected to the drive circuit at the same time.

In some embodiments, the light bar assembly further includes a switching component having one end connected to the drive circuit, and the other end configured to be electrically connected to one of the first circuit and the second circuit.

In some embodiments, the plurality of backlights emit light toward a first direction, and the at least one fill light emits light toward a second direction different from the first direction.

In some embodiments, the first direction is a direction perpendicular to a length direction of the light bar printed circuit board and parallel to a plane of the light bar printed circuit board, and the second direction is a direction perpendicular to the plane of the light bar printed circuit board.

In some embodiments, the at least one fill light is disposed at an end of a length direction of the light bar assembly.

In some embodiments, the light bar printed circuit board has two opposite sides, and the at least one fill light and the plurality of backlights are disposed on the same side of the light bar printed circuit board.

According to another aspect of the present disclosure, there is provided a backlight unit including a light guide plate and the light bar assembly as described above, wherein the light guide plate has a light incident surface and a light emitting surface, and the first direction points to the light incident surface of the light guide plate.

In some embodiments, the backlight unit further includes: a backlight film material disposed on a side of the light emitting surface of the light guide plate; and a first reflective sheet disposed on a side of the light guide plate facing away from the light emitting surface.

According to yet another aspect of the present disclosure, there is provided a display unit including a liquid crystal panel and the backlight unit as described above, the liquid crystal panel is opposite to the light emitting surface of the light guide plate.

In some embodiments, the display unit further includes a second reflective sheet covering the backlights and exposing the fill light, a reflective surface of the second reflective sheet facing the backlights.

In some embodiments, the display unit further includes a light shielding member covering the backlights and exposing the fill light.

In some embodiments, the liquid crystal panel includes a single layer region having a cut portion in a region corresponding to the fill light.

According to still another aspect of the present disclosure, there is provided a mobile electronic device including a camera, a control unit, and the display unit as described above, wherein the second direction is the same as an orientation of the camera, and the control unit is configured to supply power to the second circuit and stop supplying power to the first circuit when the camera is operated, and supply power to the first circuit and stop supplying power to the second circuit when the camera is stopped.

In some embodiments, an orientation of the liquid crystal panel in the display unit is the same as the orientation of the camera.

In some embodiments, the mobile electronic device is a mobile phone or a tablet.

DETAILED DESCRIPTION

To improve understanding of the technical solution of the present disclosure for those skilled in the art, the present disclosure will now be described in detail in conjunction with accompanying drawings and specific embodiments.

Figure 2:
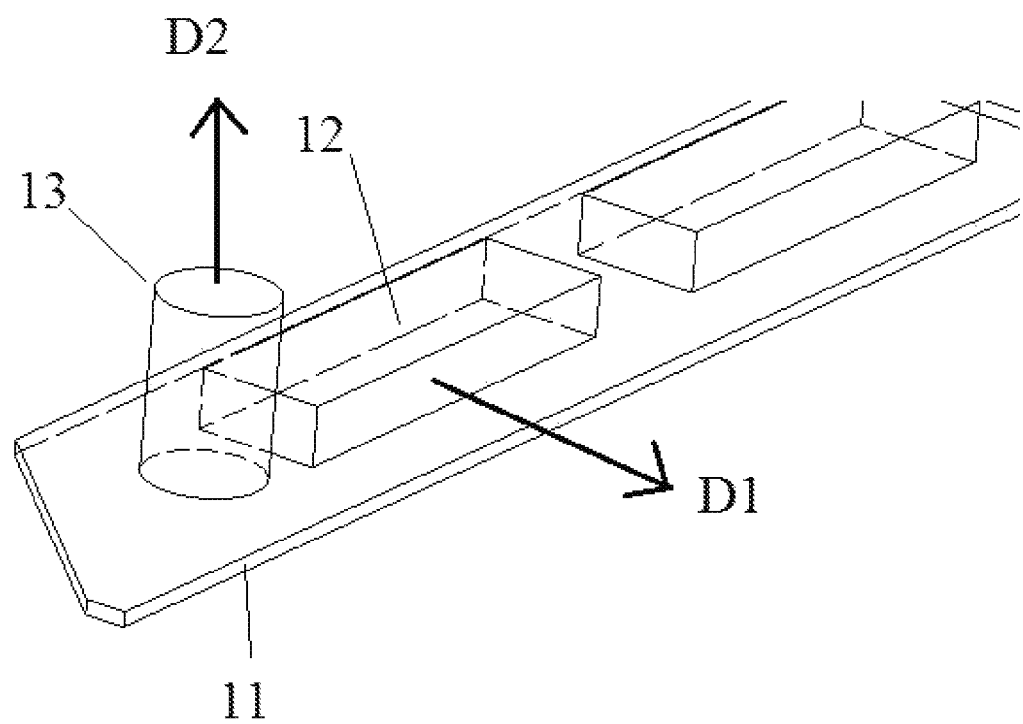
FIG. 2 is a partial perspective view of the structure of the light bar assembly of FIG. 1.
Figure 8:
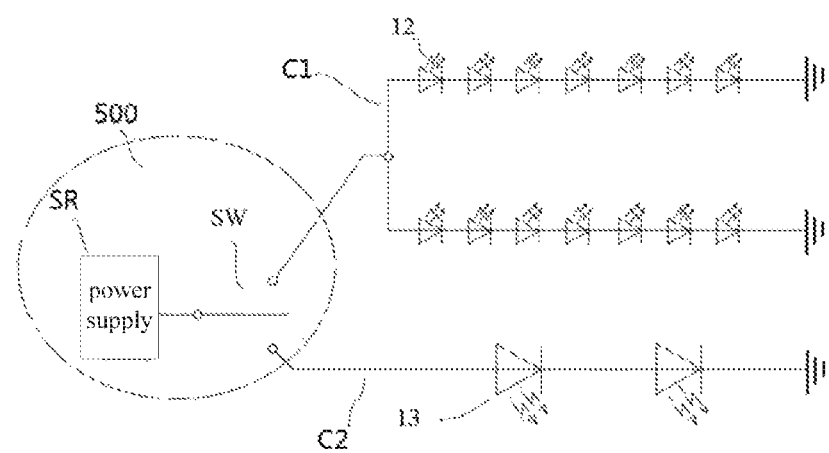
FIG. 8 is a circuit diagram showing a light bar assembly in combination with a control unit according to an exemplary embodiment of the present disclosure.

According to an aspect of the present disclosure, there is provided a light bar assembly. As shown in FIGS. 2 and 8, the light bar assembly includes a light bar printed circuit board 11, and a plurality of backlights 12 electrically connected to the light bar printed circuit board 11, each of which emits light toward a first direction D1. The light bar assembly further includes at least one fill light 13 electrically connected to the light bar printed circuit board 11, each of which emits light toward a second direction D2 different from the first direction D1. The light bar printed circuit board 11 includes a first circuit C1 for supplying power to the backlights 12 in connection with a drive circuit, and a second circuit C2 for supplying power to the fill light 13 in connection with a drive circuit, the first circuit C1 and the second circuit C2 being insulated from each other.

In an exemplary embodiment of the present disclosure, the first circuit C1 is, for example, a lead on the light bar printed circuit board 11, and the second circuit C2 is, for example, also a lead on the light bar printed circuit board 11.

That is, the same light bar printed circuit board 11 is used for supplying power to both the backlights 12 and the fill light 13. Each of the backlights 12 emits light in the first direction D1, and may be applied to a backlight unit of a liquid crystal display unit as a light source for the backlight unit. The fill light 13 emits light in the second direction D2, and may be applied to mobile electronic products, such as mobile phones, for filling light for photographs.

The light bar printed circuit board 11 is, for example, a flexible printed circuit board (FPC), and the backlights 12 and the fill light 13 may be, for example, LEDs (light emitting diodes). By integrally arranging the backlights 12 and the fill light 13 on the light bar printed circuit board 11, components can be arranged in saved space.

In an exemplary embodiment of the present disclosure, the above first circuit C1 and second circuit C2 may be any circuit as long as power supply requirements are satisfied. The first circuit C1 is, for example, a lead of the light bar printed circuit board 11 for connecting the backlights 12 to an external drive circuit, and the second circuit C2 is, for example, a lead of the light bar printed circuit board 11 for connecting the fill light 13 to an external drive circuit. As shown in FIG. 8, a plurality of backlights 12 in the first circuit C1 are connected in series or in parallel, while a plurality of fill lights 13 in the second circuit C2 are connected in series. In addition, as shown in FIG. 8, the first circuit C1 and the second circuit C2 are not connected to each other, but are connected to a power supply via a switch SW. When the first circuit C1 is connected to the power supply via the switch SW, the second circuit C2 is not connected to the power supply. Likewise, when the second circuit C2 is connected to the power supply via the switch SW, the first circuit C1 is not connected to the power supply. That is, the first circuit C1 and the second circuit C2 are not connected to the drive circuit or the power supply at the same time. That is, the light bar assembly includes a switch SW as an example of a switching component, one end of which is connected to a drive circuit or a power supply, while the other end of which is connected to the first circuit C1 or the second circuit C2. In this design, the plurality of backlights 12 may be extinguished, for example, at the moment of photographing, while one or two fill lights 13 are lightened (i.e., the switch SW is switched from a state connected with the first circuit C1 to a state connected with the second circuit C2). In this case, a smaller number of fill lights 13, compared with the plurality of backlights 12, may enable passing of a larger current at the same voltage so that the luminance of the fill lights 13 is much greater than that of the backlights 12, thereby providing luminance that fully meets the requirements of photographing. It should be understood that the plurality of fill lights 13 may also be connected in parallel so that a greater current flows through the respective fill lights 13 to provide greater luminance for photographing. Such reasonable circuit design of the above light bar assembly can simplify the product structure without affecting normal use of the product.

As described above, the structural complexity of the mobile electronic product can be reduced since a separate printed circuit board corresponding to the fill light 13 is not necessary.

In an exemplary embodiment of the present disclosure, as shown in FIG. 2, the first direction D1 is a direction perpendicular to a length direction of the light bar printed circuit board 11 and parallel to a plane of the light bar printed circuit board 11, and the second direction D2 is a direction perpendicular to the plane of the light bar printed circuit board 11. That is, the first direction D1 is perpendicular to the second direction D2.

Figure 3:
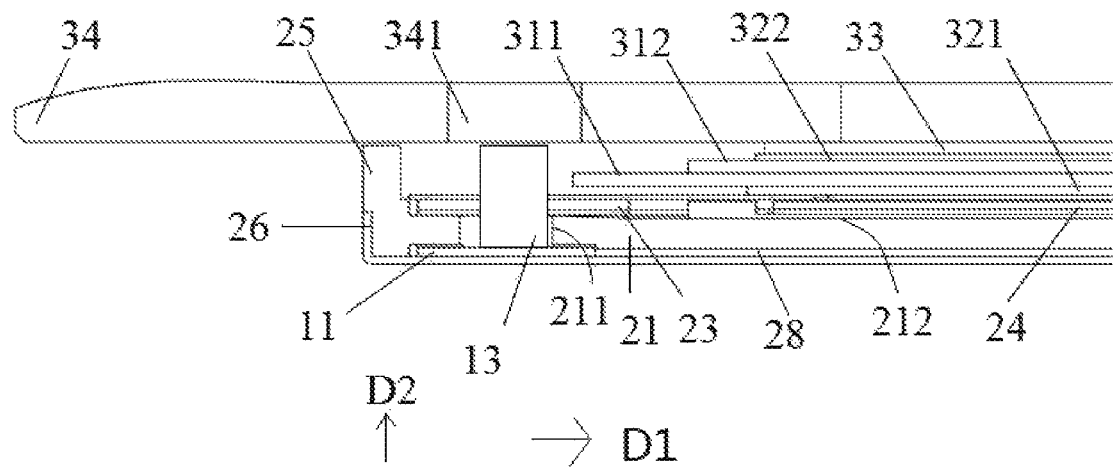
FIG. 3 is a cross sectional view showing a display unit according to an exemplary embodiment of the present disclosure.

As shown in FIG. 3, the light bar assembly with such design may be applied to an edge-lit backlight unit (a unit consisting of the light bar assembly and a backplane 26, a plastic frame 25, a backlight film material 24, a first reflective sheet 28, and a light guide plate 21). Further, the edge-lit backlight unit may be applied to a liquid crystal display unit (including the backlight unit as described above and a lower polarizer 321, a lower substrate 311, an upper substrate 312, and an upper polarizer 322). The light emitted from the backlights 12 toward the first direction D1 perpendicularly enters a light incident surface 211 of the light guide plate 21 in the edge-lit backlight unit, and then is emitted from a light emitting surface 212 perpendicular to the light incident surface 211 to provide a backlight source for liquid crystal display.

As shown in FIG. 3, when applied to a mobile electronic product such as a mobile phone, the liquid crystal display unit displays an image at the same orientation as the second direction D2 in which the fill light 13 emits light, thereby filling light by the fill light 13 of the light bar assembly for photographing of the user. It is noted that the light emitted from the fill light 13 does not need to pass through the edge-lit backlight unit, or the lower substrate 311, the upper substrate 312, the upper polarizer 322, and the lower polarizer 321. In this way, compared with filling light for photographing of the user by the liquid crystal display unit, a brighter fill light may be provided for photographing of the user without consuming backlights of the liquid crystal display unit, thereby prolonging the life of the backlights.

It should be noted that the second direction D2 is not limited to the direction shown in FIG. 2. That is, in mobile electronic products, the light emitting direction of the fill light 13 is not limited to a direction the same as the orientation of display. For example, the second direction D2 may be opposite to the orientation of display or perpendicular to the orientation of display, etc., which can be designed differently by those skilled in the art according to actual needs.

Figure 1:
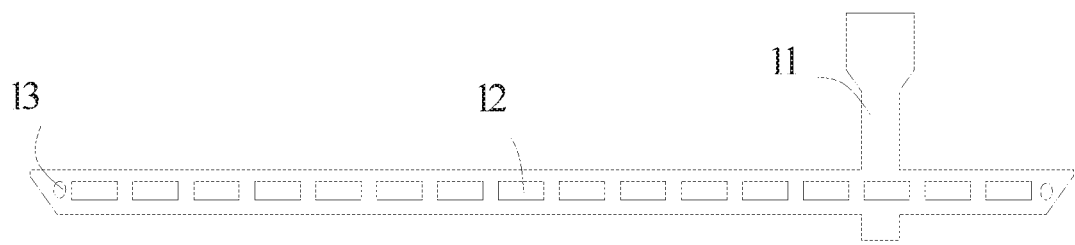
FIG. 1 is a schematic plan view showing a structure of a light bar assembly according to an exemplary embodiment of the present disclosure.

In an exemplary embodiment of the present disclosure, as shown in FIGS. 1 and 2, the fill light 13 is disposed at an end of the light bar assembly in the length direction.

Those skilled in the art may provide fill lights 13 at one end or both ends of the light bar assembly in the length direction.

Thus, the number and distribution of the backlights 12 may be designed according to the related art without any modification, thereby reducing the design difficulty.

It should be noted that those skilled in the art may also provide fill lights 13 between the plurality of backlights 12, which is not specifically limited herein.

In an exemplary embodiment of the present disclosure, as shown in FIG. 2, the respective fill lights 13 and backlights 12 are disposed on the same side of the light bar printed circuit board 11.

With such arrangement, line traces inside the light bar printed circuit board 11 are more regular, resulting in easier routing and reduced difficulty.

It should be noted that those skilled in the art may also provide the fill lights 13 and the backlights 12 on both sides of the light bar printed circuit board 11, which is not specifically limited herein.

According to another aspect of the present disclosure, there is provided a backlight unit and a display unit. As shown in FIG. 3, the backlight unit includes the light bar assembly as described above, and a light guide plate 21 having a light incident surface 211 and a light emitting surface 212. A first direction D1 refers to a direction pointing to the light incident surface 211 of the light guide plate 21. As described above, the backlight unit further includes: a backlight film material 24 disposed on a side of the light emitting surface 212 of the light guide plate 21; and a first reflective sheet 28 disposed on a side of the light guide plate 21 facing away from the light emitting surface 212. As shown in FIG. 3, the display unit includes the above backlight unit, and a liquid crystal panel (which may include a lower substrate 311, an upper substrate 312, etc.) disposed outside of the light emitting surface 212, i.e., disposed opposite to the light emitting surface 212 of the light guide plate 21.

That is, the above light bar assembly is applied to the backlight unit, and then the backlight unit is applied to the display unit. It is noted that the backlight unit is an edge-lit backlight unit. When the display unit is applied to a mobile electronic device, the structural complexity of the mobile electronic product can be reduced since a separate printed circuit board corresponding to the fill light 13 is not necessary.

In an exemplary embodiment of the present disclosure, as shown in FIG. 3, the above backlight unit consists of the backplane 26, the plastic frame 25, the first reflective sheet 28, the light guide plate 21, the backlight film material 24 (including, for example, upper and lower prismatic lenses, etc.) and the light bar assembly as described above. FIG. 3 shows a fill light 13 in the light bar assembly. Light emitted from the backlights 12 of the light bar assembly enters the light guide plate 21 at the light incident surface 211 of the light guide plate 21, and then exits at the light emitting surface 212 before entering the backlight film material 24.

The backlight unit is combined with the lower polarizer 321, the liquid crystal panel, and the like to form the display unit.

It is noted that an optically clear adhesive (OCA) 33 is also shown in FIG. 3. The OCA 33 bonds the upper substrate 312 of the liquid crystal panel to a cover plate 34. If the cover plate 34 has a touch function, or the liquid crystal panel is compatible with a touch function, the components shown in FIG. 3 constitute a touch-display unit as a whole.

A light transmitting region 341 is provided at a position of the cover plate 34 corresponding to the fill light 13, which is advantageous for reducing loss of the light emitted from the fill light 13 due to the cover plate 34.

Figure 4:
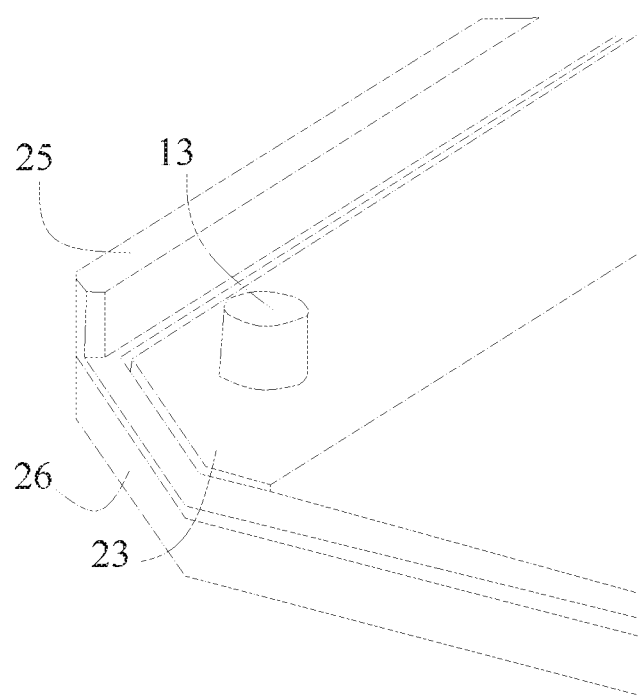
FIG. 4 is a partial perspective view of the structure of the display unit of FIG. 3.

In an exemplary embodiment of the present disclosure, as shown in FIGS. 3 and 4, the respective fill lights 13 and the respective backlights 12 are disposed on the same side of the light bar printed circuit board 11, and the display unit further includes a second reflective sheet 23 covering the backlights 12 and exposing the fill light 13, a reflective surface of the second reflective sheet 23 facing the backlights 12.

It is to be noted that the function of the second reflective sheet 23 here is to prevent light leakage of the liquid crystal display unit at the backlights 12. The second reflective sheet 23 exposes the fill light 13 to make light emitted from the fill light 13 smoothly emitted from the display unit.

Figure 5:
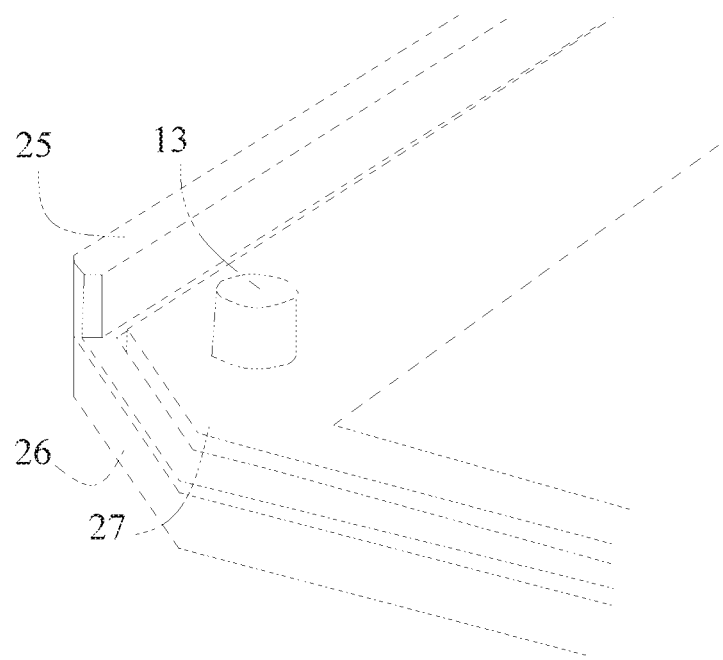
FIG. 5 is a partial perspective view of the structure of the display unit of FIG. 3.

In an exemplary embodiment of the present disclosure, the respective fill lights 13 and the respective backlights 12 are disposed on the same side of the light bar printed circuit board 11, and as shown in FIG. 5, the display unit further includes a light shielding member 27 covering the backlights 12 and exposing the fill light 13.

The light shielding member 27 is, for example, a black light-shielding tape also having a function to prevent light leakage of the liquid crystal display unit at the backlights 12. The light shielding member 27 also exposes the fill light 13 to make light emitted from the fill light 13 smoothly emitted from the display unit.

In an exemplary embodiment of the present disclosure, the second reflective sheet 23 and the light shielding member 27 are both disposed in the display unit so that the function of the two are further enhanced.

It is noted that the light shielding member 27 of FIG. 5 has an additional strip compared with the second reflective sheet 23 of FIG. 4, which strip serves to fill a gap between the liquid crystal panel and the plastic frame 25, so as to prevent light leakage.

Figure 6:
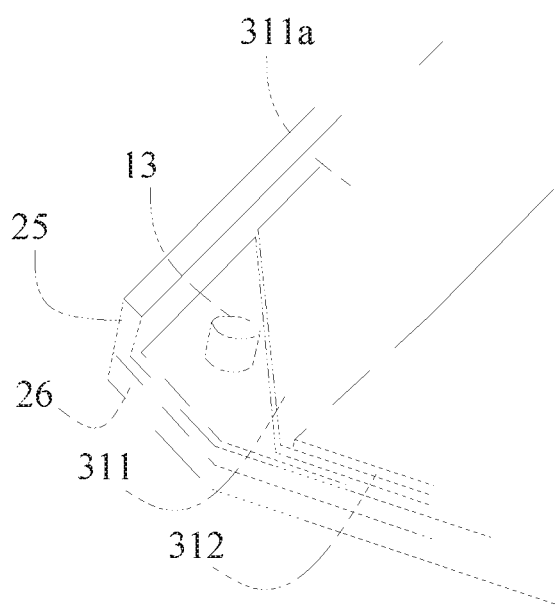
FIG. 6 is a partial perspective view of the structure of the display unit of FIG. 3.

In an exemplary embodiment of the disclosure, as shown in FIG. 6, the liquid crystal panel includes a single layer region 311a having a cut portion 311a in a region corresponding to the fill light 13. The single layer region 311a, i.e., a portion of the lower substrate 311 of the liquid crystal panel beyond the upper substrate 312, is provided with a plurality of electrodes and corresponding lines for connecting an external liquid crystal drive circuit with a circuit inside the lower substrate 311.

The cut portion at the corner of the lower substrate 311 in FIG. 6 is also referred to as a C-corner cut structure. A general manufacturing method is to cut off corners of the single layer region 311a while the liquid crystal panel is cut.

The cut portion is configured to, on one hand, give way to the fill light 13, and, on the other hand, prevent the single layer region 311a from damaging the light emitted from the fill light 13.

Figure 7:
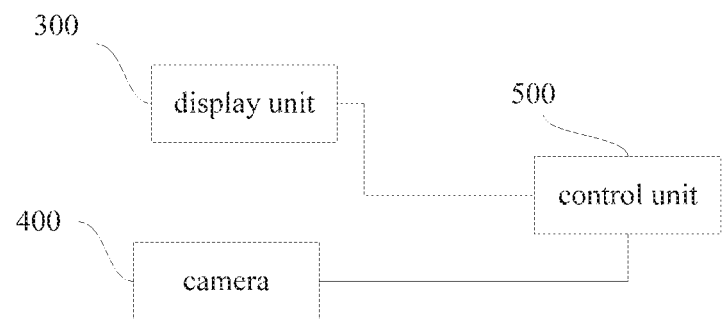
FIG. 7 is a block diagram showing a structure of a mobile electronic device according to an exemplary embodiment of the present disclosure.

According to yet another aspect of the present disclosure, there is provided a mobile electronic device. As shown in FIGS. 7 and 8, the mobile electronic device includes the display unit 300 as described above, and further includes a camera 400, and a control unit 500. The second direction D2 is the same as an orientation of the camera 400. The control unit 500 is configured to supply power to the second circuit C2 and stop supplying power to the first circuit C1 when the camera 400 is operated, and supply power to the first circuit C1 and stop supplying power to the second circuit C2 when the camera 400 is stopped.

For example, as shown in FIG. 8, the control unit 500 may include a power supply SR, and a switch SW (which, for example, may have an action associated with a camera signal). By selecting to connect the switch SW with the first circuit C1 or the second circuit C2, it is realized that the second circuit C2 is connected to the power supply SR, and the fill light 13 is turned on at the moment of photographing, while the first circuit C1 is disconnected from the power supply SR, and the backlights 12 are turned off. After the photographing is completed, the second circuit C2 is disconnected from the power supply SR, and the fill light 13 is turned off, while the first circuit C1 is connected to the power supply SR, and the backlights 12 are turned on.

In an exemplary embodiment of the present disclosure, the second direction D2 is the same as an orientation of the camera 400. That is, a light emitting direction of the fill light 13 is the same as an orientation of the camera 400.

When the camera 400 is operated, the second circuit C2 obtains power supply, and the fill light 13 connected to the second circuit C2 is turned on to fill light for photographing of the user, while power supply to the first circuit C1 is cut off, the backlights 12 are turned off, and the display unit 300 does not display any more. When the camera 400 is stopped, the first circuit C1 obtains power supply, and the display unit 300 resumes display, while power supply to the second circuit C2 is cut off, and the fill light 13 is turned off.

Since the mobile electronic device turns off the display unit 300 at the moment of photographing, there is little influence on the user, and the power consumption is reduced.

In an exemplary embodiment of the present disclosure, the control unit 500 consists of, for example, a central processing unit (CPU) and a driving chip. This driving chip is controlled to supply power to the first circuit C1 and the second circuit C2, respectively. When the CPU controls the driving chip to be operated, the driving chip supplies power to the corresponding first circuit C1 or second circuit C2, thereby lighting the corresponding backlight 12 or fill light 13. When the CPU controls the driving chip to be stopped, the driving chip does not supply power to the corresponding first circuit C1 or second circuit C2, thereby distinguishing the corresponding backlight 12 or fill light 13. Such circuit is simple in structure and practical in use.

In an exemplary embodiment of the present disclosure, the display panel in the display unit 300 has the same orientation as the camera 400.

In this case, the display panel displays an image toward the user, and the camera 400 photographs the user toward the user. That is, in this example, the camera 400 may be referred to as a front camera.

In an exemplary embodiment of the present disclosure, the mobile electronic device is a mobile phone or a tablet.

It should be understood that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. A light bar assembly, comprising:
   a light bar printed circuit board;
   a plurality of backlights electrically connected to the light bar printed circuit board; and
   at least one fill light electrically connected to the light bar printed circuit board,
   wherein the light bar printed circuit board includes a first circuit and a second circuit connected to a drive circuit, the first circuit is configured to provide an electrical signal to the backlights, and the second circuit is configured to provide an electrical signal to the fill light,
   wherein the first circuit and the second circuit are configured to be not connected to the drive circuit at the same time, and
   wherein the light bar assembly further comprises a switching component having one end connected to the drive circuit, and the other end configured to be electrically connected to one of the first circuit and the second circuit.

2. The light bar assembly according to claim 1, wherein the plurality of backlights emit light toward a first direction, and the at least one fill light emits light toward a second direction different from the first direction.

3. The light bar assembly according to claim 2, wherein the first direction is a direction perpendicular to a length direction of the light bar printed circuit board and parallel to a plane of the light bar printed circuit board, and the second direction is a direction perpendicular to the plane of the light bar printed circuit board.

4. The light bar assembly according to claim 1, wherein the at least one fill light is disposed at an end of a length direction of the light bar assembly.

5. The light bar assembly according to claim 2, wherein the light bar printed circuit board has two opposite sides, and the at least one fill light and the plurality of backlights are disposed on the same side of the light bar printed circuit board.

6. A backlight unit, comprising a light guide plate and the light bar assembly according to claim 5, wherein the light guide plate has a light incident surface and a light emitting surface, and the first direction points to the light incident surface of the light guide plate.

7. The backlight unit according to claim 6, further comprising: a backlight film material disposed on a side of the light emitting surface of the light guide plate; and a first reflective sheet disposed on a side of the light guide plate facing away from the light emitting surface.

8. A display unit, comprising a liquid crystal panel and the backlight unit according to claim 6, the liquid crystal panel is opposite to the light emitting surface of the light guide plate.

9. The display unit according to claim 8, further comprising a second reflective sheet covering the backlights and exposing the fill light, a reflective surface of the second reflective sheet facing the backlights.

10. The display unit according to claim 8, further comprising a light shielding member covering the backlights and exposing the fill light.

11. The display unit according to claim 8, wherein the liquid crystal panel includes a single layer region having a cut portion in a region corresponding to the fill light.

12. A mobile electronic device, comprising a camera, a control unit, and the display unit according to claim 8,
   wherein the second direction is the same as an orientation of the camera, and
   the control unit is configured to supply power to the second circuit and stop supplying power to the first circuit when the camera is operated, and supply power to the first circuit and stop supplying power to the second circuit when the camera is stopped.

13. The mobile electronic device according to claim 12, wherein an orientation of the liquid crystal panel in the display unit is the same as the orientation of the camera.

14. The mobile electronic device according to claim 12, wherein the mobile electronic device is a mobile phone or a tablet.

* * * * *